Sept. 17, 1963 G. B. ACHTMEYER ETAL 3,104,070
WINDING APPARATUS FOR DYNAMO ELECTRIC MACHINES
Filed June 7, 1961 2 Sheets-Sheet 1
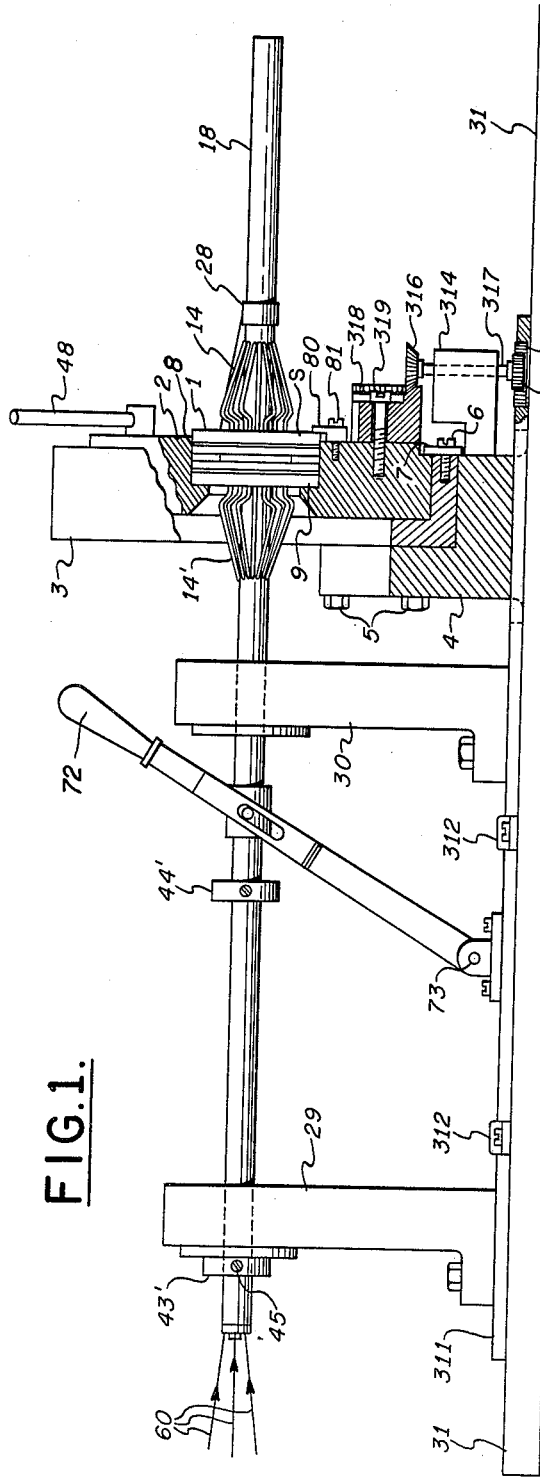
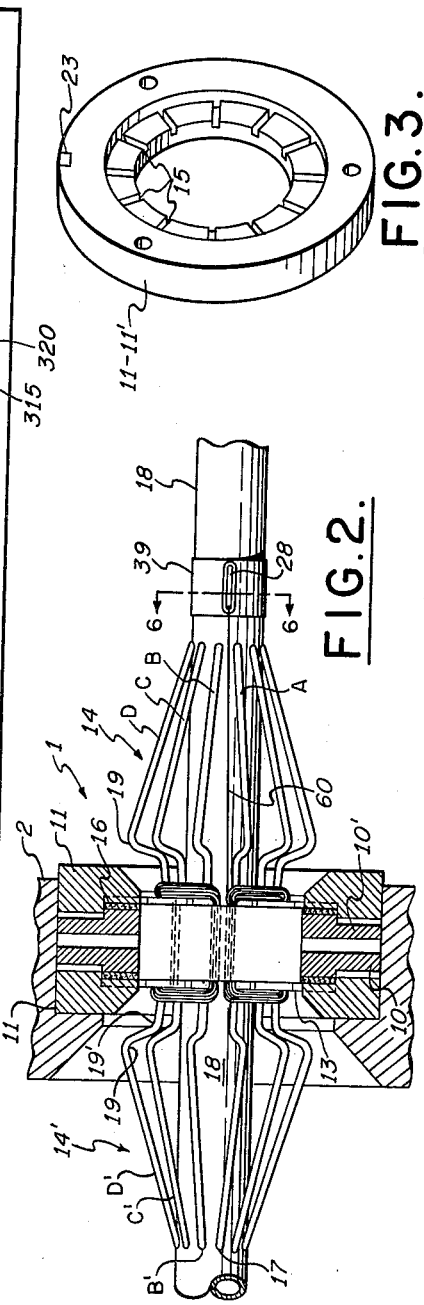
INVENTORS
GEORGE B. ACHTMEYER
FRANCIS M. POTTER
BY
ATTORNEY Sept. 17, 1963 G. B. ACHTMEYER ETAL 3,104,070
WINDING APPARATUS FOR DYNAMO ELECTRIC MACHINES
Filed June 7, 1961 2 Sheets-Sheet 2
FIG.4.
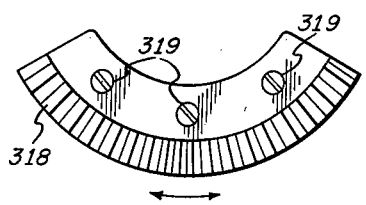
FIG.6.
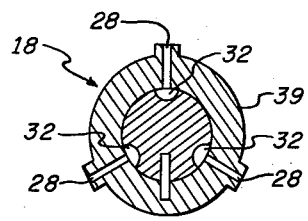
FIG.5.
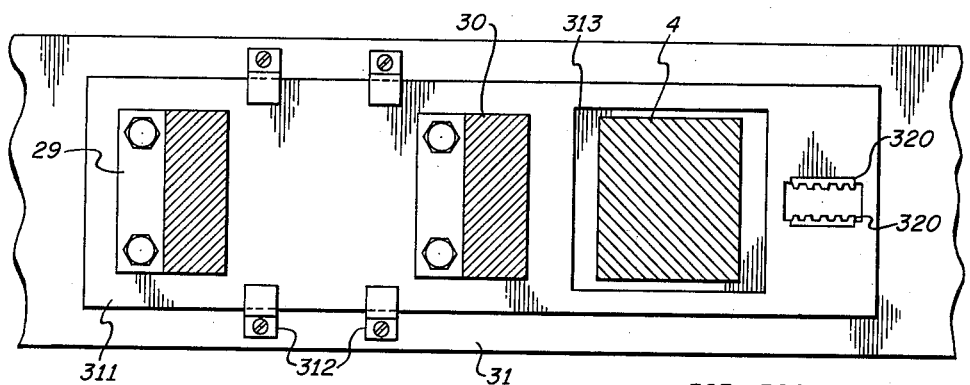
FIG.7.
FIG.8.
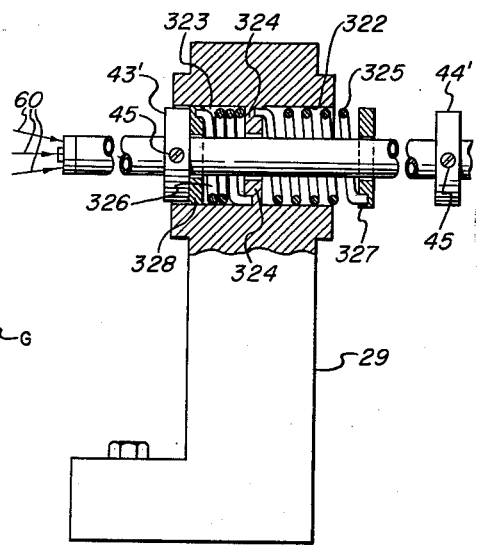
FIG.9.
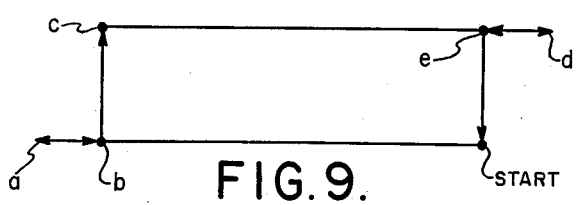
INVENTORS
GEORGE B. ACHTMEYER
FRANCIS M. POTTER
BY
Henry Heyff
ATTORNEY

United States Patent Office 3,104,070
Patented Sept. 17, 1963

3,104,070
WINDING APPARATUS FOR DYNAMO ELECTRIC MACHINES
George B. Achtmeyer, Huntington, and Francis M. Potter, Garden City, N.Y., assignors to Sperry Rand Corporation, Great Neck, N.Y., a corporation of Delaware
Filed June 7, 1961, Ser. No. 115,368
4 Claims. (Cl. 242—1.1)

This invention relates to the windings of armatures or stators of dynamo electric machines, and more especially, to the winding of the hollow stators of such machines with extremely fine wire, the slots for the windings being formed in the inner cylindrical surface of a hollow cylindrical core. By our improved method and machine, the windings are wound directly in these slots, whereas the present practice usually comprises forming the windings on a separate mandrel and inserting them by hand after being so formed in the slots of the stators. This process is slow, tedious and difficult, especially for the stators of miniaturized motors and generators which are now being used in quantity in the electrical industry. With our machine for winding the coils directly in the slots much time is saved and perfectly formed stators are secured. While our invention is especially adapted for the winding of hollow stators as stated, it may also be used for winding armatures with external slots, as is the case with most armatures.

While we are aware that automatic machines have been proposed for winding the slotted cores of dynamo electric machines, none have met with material success because of the complexity created by trying to design a machine for moving wire engaging fingers in the same manner that a skilled winder would move his fingers during the winding process. Although we have shown a hand-operated winding machine, full automatic operation of the same becomes simple and obvious.

Also, according to our invention, several coils may be wound simultaneously in a plurality of pairs of slots for one setting of the machine, thereby effectiing a great time saving in the winding of stators having a plurality of field coils.

This application is a continuation-in-part of copending application S.N. 690,352, filed October 15, 1957, assigned to the assignee of this application.

Referring to the drawings in which several forms of the invention are shown,

FIG. 1 is a front elevation, partly in section, of a presently preferred form of our stator winding machine;

FIG. 2 is a horizontal section of the main portion of the machine on a larger scale showing the core holder and feed rod;

FIG. 3 is a perspective view of the finger retaining ring portion of the holder;

FIG. 4 is a front view of a gear plate adapted to be secured to the holder;

FIG. 5 is a top view of a base plate adapted to be moved relative to the holder;

FIG. 6 is a section also taken on line 6—6 of FIG. 2, but showing on a larger scale only the feed shaft and the eye through which the wire emerges;

FIG. 7 is a diagram useful in describing one form of the invention;

FIG. 8 is a partial cutaway view of a bracket useable with one form of the invention; and FIG. 9 is a diagram useful in describing an embodiment of the invention.

Referring to FIGS. 1–6, a multi part holder 1 for the stator core S to be wound is detachably clamped within a hollow round chuck 2 which in turn is rotatably mounted within an open sided guide or channel ring 3 secured in the main bracket 4 by screws 5. The main bracket 4 is secured to a base 31. Detachable set screws 6 having collars 7 are shown spaced around the outer periphery of ring 3 to hold chuck 2 in place, but permit rotation thereof in ring 3. The chuck 2 is provided with a recessed aperture 8 extending therethrough but having an internal shoulder 9 against which the holder 1 is detachably clamped by fingers 80 and set screws 81.

Holder 1 is a composite demountable structure preferably comprising a pair of inner rings 10 and 10' which surround the core S to be wound and are individually and detachably clamped to a second pair of rings 11 and 11' by means of a plurality of spaced set screws threaded into rings 10 and 10'. The upturned inner ends 13 of two sets of oppositely extending fingers or guides 14, 14' are inserted before core S is fitted within the holder during the assembly of the holder structure and fitted into radial open channels 15 around the inner faces of the rings 11 and 11'. See FIG. 3. Fibre washers 16 are placed between rings 10 and 11 and between rings 10' and 11' so that when the set screws are tightened the ends 13 of the fingers 14 are firmly held in place and clamped against the core, with the fingers radially positioned as shown in the drawings so that the outer end 17 of each finger will rest against or close to the feed rod 18 in the assembled position. Each guide has a knee portion 19 rising above the rod and beyond the core, and a U-shaped or channel portion 19' adjacent the inner end of each finger extending radially inwardly and then axially to form a rest for the inner turns of the coil being wound.

The holder or ring structure may be completely assembled with the fingers attached thereto and with the core therein before being placed within aperture 8 in chuck 2 or the ring structure 10 and 11 with its fingers 14 may first be inserted within the aperture 8 of chuck 2 to bring it against shoulder 9 followed by core S and rings 10' and 11' and its fingers 14'. The whole is then inserted in ring 3 with key way 23 engaging a key in the ring 3 to prevent relative rotation. This assembly is then clamped in place in chuck 2 by the set screws 81 and fingers 80 with the ends of the guide fingers 14, 14' resting against the feed rod 18 so that the stator is clamped between the upturned ends 13 of the two groups of fingers 14 and 14'. During assembly, the fingers 14, 14' should be symmetrically positioned with respect to the poles and slots in the stator S with the eye or nozzle 28 of the feed rod 18 between adjacent poles and fingers 14 so that the wire 60 is drawn into the two slots between adjacent pairs of poles as the rod 18 is reciprocated.

Feed rod 18 may extend through and well beyond sides of the chuck 2 and the outer ends of the guide fingers, as shown in FIG. 1, and is slidably mounted in spaced brackets 29, 30 fixed to a slidable plate 311, the plate being slidable in angle brackets 312 on the base 31. The plate 311 (see FIG. 5) is provided with an opening 313 which is adapted to contain the main bracket 4; the opening 313 is made large enough to permit some reciprocating movement between the base 31 and the plate 311. Mounted on the main bracket 4 is a gear assembly 314 having a spur gear 315 connected to a bevel gear 316 by means of a shaft 317. The bevel gear 316 meshes with a gear on a plate 318 (see FIGS. 1 and 4), the bevel gear being secured to the chuck 2 by screws 319; the spur gear 315 meshes with racks 320 on the plate 311; rotation of the chuck 2, therefore, imparts relative reciprocating movement between the plate 311 and the base 31. At least one end of the rod 18 is provided with one or more channels 32 for the wire or wires 60 to be wound on the stator, each eye being located in radial alignment with a stator slot. See FIG. 6.

The rod 18 is shown as given a reciprocating intermittent motion as by means of a handle 72 pivotable at 73 on the plate 311 by having a slot connection with the rod 18, the limits of the reciprocating motion being fixed by stops 43', 44' adjustably mounted on rod 18 as by means of setscrews 45. The stops are adjusted for the thickness of cores being wound.

At or near the end of each stroke of the feed rod in each direction a relative intermittent rotation or oscillation first in one direction and then the other is imparted to the core and fingers through an angle equal to the angle between the pair of slots in the core which are being wound. Thus, if a three phase stator is being wound, three pairs of slots may be wound simultaneously with the coils 120° apart so that the head is given a rotation of about 120° first in one direction and then the other at the end of each stroke in each direction.

Operation of the first stroke of the feed rod carries the wire from the position shown in FIG. 2 between two fingers A and B, through the stator and beyond the ends of the group of fingers 14' on the opposite side of the chuck. Then the chuck is rotated through the set angle by applying a force to handle 48. As provided by this improvement of the apparatus disclosed in application Serial No. 690,352, when the chuck 2 rotates the gear assembly 314 imparts a small amount of reciprocating movement to the plate 311, thereby releasing some tension in the wire 60. Then the feed rod is moved back toward its original position and the wire is carried up over the intermediate fingers B', C', D' and E' which are four in number in the setup described. As the feed rod continues to move to the right, the loop thus formed is drawn over these intermediate fingers and is pulled down into the U-shaped notch 19' beyond the humps or knees 19 so that it is then drawn across one end of the face of the stator but is bowed outwardly or radially so as not to extend below the inner surface of the poles where it would interfere with the armature when inserted in place and so that no wire is drawn across the intermediate slots, leaving the slots clear for the next winding. Without the aforementioned release in tension, fine wire, as it is drawn up over the intermediate fingers B', C', D' and E', is put under an increased tension, thereby causing the wire to break often. The wire is then drawn through the stator back between fingers and beyond the ends of the fingers. Then the chuck 2 is rotated back to its original position, thereby causing the tension in the wire 60 to release by means of a small amount of reciprocating movement being again imparted to the plate 311. In rotating the chuck, the wire is drawn across intermediate fingers B, C, D and E as at the other end of the stroke. This process is continued until one coil is wound, or if a plurality of coils are being wound simultaneously until the group of coils is wound.

FIG. 7 is a vector diagram depicting the aforedescribed operations: Vector A represents the relative reciprocating movement between the feed rod 18 and the stator that is caused by movement of the rod 18 relative to the fixed base 31. Vector B, the resultant of vectors C and D, represents the relative movement between the rod 18 and the stator that results when the chuck 2 is rotated; vector C represents the rotational movement of the rod 18 relative to the stator and vector D, caused by such rotational movement, represents the reciprocating movement of the rod resulting from the imparted relative reciprocating motion between the base 31 and the plate 311. Vector E represents the return stroke of the rod 18 and vectors G and H, like vectors C and D, represent respectively relative rotational and reciprocating movement, vector F being representative of the resultant of the combination of such movements.

If preferred, the invention may be practiced without relative movement between the base 31 and the plate 311 if the bracket 29 is modified as shown in FIG. 8 and the gear assembly 314 is removed. In FIG. 8, a cutaway view of the modified form of bracket 29 has two spring retaining recesses 322 and 323 separated by an annular ring 324. Springs 325 and 326 are contained respectively within the recesses 322 and 323 and connect to washers 327 and 328. With this embodiment of the invention, the feed member 28 is brought through the stator by moving the handle 72 to the left until the stop 44' engages the washer 327 to compress the spring 325. As soon as the handle 72 is released, the spring 325 causes the handle 72 (and therefore the rod 18) to bounce back a small amount, thereby causing the wire 60 to bow, such bowing releases the tension in the wire 60. Then the chuck 2 is rotated. After the chuck 2 is rotated, the handle 72 is moved to the right until the spring 328 is compressed, such compression producing a bounce-back motion as described above to release again tension in the wire 60. The chuck 2 is then rotated before repeating the operation.

FIG. 9, like FIG. 7, is a vector diagram depicting the aforementioned operation: The handle 72 moves the feed member 28 from a Start position to position $a$ and, when the handle is released, the feed member 28 bounces back to position $b$. After rotation of the chuck 2, the feed member, at position $c$, is moved therefrom by the handle 72 to positon $d$. Upon release of the handle 72, the feed member 28 bounces back to position $e$ from which it is returned to its Start posiiton by rotation of the chuck 2.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for laying a winding in a pair of slots in the slotted core of a dynamo electric machine, comprising a temporary holder for said core, said temporary holder securing said core at the opposite ends thereof, a feed member of substantially circular cross section extending in coaxial relationship with the core mounted in said holder, said feed member having an eye intermediate its ends for the passage of wire from an external supply through said eye, two pairs of wire guide fingers detachably secured to each end of said holder remote from said core, one finger adjacent each end of each of said slots, each of said guide fingers having a U-shaped portion adjacent said holder for supporting the end turn portions of the winding, said fingers further extending axially beyond the ends of said holder and terminating at spaced points substantially at the surface of said feed member, said points being spaced along a curve transverse to the axis of said feed member by amounts sufficient to permit the entry of said wire therebetween; means for imparting relative rectilinear reciprocation to said holder and feed member solely along the axis of said core to cause the eye to pass from one end to the other of said holder and core to one side of a finger of each pair, means for relatively rotating said holder and feed member about the axis of said core through at least the angle between said slots just prior to each return stroke whereby the eye on the return strokes of reciprocation passes to the remote side of the other fingers of each pair, and means adapted to impart slight relative rectilinear motion of the core and feed member along the axis of the core in the direction of the return stroke prior to the completion of the relative rotation of said holder and feed member, thereby releasing tension in the wire during such relative rotation.

2. Apparatus for laying a winding in a pair of slots in the slotted core of a dynamo electric machine, comprising a temporary holder for said core, said temporary holder securing said core at the opposite ends thereof, a feed member of substantially circular cross section extending in coaxial relationship with the core mounted in said holder, said feed member having an eye intermediate its ends for the passage of wire from an external supply through said eye, two pairs of wire guide fingers detachably secured to each end of said holder remote from said core, one finger adjacent each end of each of said slots, each of said guide fingers having a U-shaped portion adjacent said holder for supporting the end turn portions of the winding, said fingers further extending axially beyond the ends of said holder and terminating at spaced points substantially at the surface of said feed member, said points being spaced along a curve transverse to the axis of said feed member by amounts sufficient to permit the entry of said wire therebetween; means for imparting relative rectilinear reciprocation to said holder and feed member solely along the axis of said core to cause the eye to pass from one end to the other of said holder and core to one side of a finger of each pair, means for relatively rotating said holder and feed member about the axis of said core through at least the angle between said slots just prior to each return stroke whereby the eye on the return strokes of reciprocation passes to the remote side of the other fingers of each pair, and means for simultaneously imparting slight relative rectilinear movement of the core and feed member in the direction of the return stroke along the core axis when said holder and feed member are relatively rotated, thereby decreasing the tension in said wire.

3. Apparatus for laying a winding in a pair of slots in the slotted core of a dynamo electric machine, comprising a temporary holder for said core, said temporary holder securing said core at the opposite ends thereof, a feed member of substantially circular cross section extending in coaxial relationship with the core mounted in said holder, said feed member having an eye intermediate its ends for the passage of wire from an external supply through said eye, two pairs of wire guide fingers detachably secured to each end of said holder remote from said core, one finger adjacent each end of each of said slots, each of said guide fingers having a U-shaped portion adjacent said holder for supporting the end turn portions of the winding, said fingers further extending axially beyond the ends of said holder and terminating at spaced points substantially at the surface of said feed member, said points being spaced along a curve transverse to the axis of said feed member by amounts sufficient to permit the entry of said wire therebetween; means for imparting relative rectilinear reciprocation to said holder and feed member solely along the axis of said core to cause the eye to pass from one end to the other of said holder and core to one side of a finger of each pair, means for relatively rotating said holder and feed member about an axis of said core through at least the angle between said slots just prior to each return stroke whereby the eye on the return strokes of reciprocation passes to the remote side of the other fingers of each pair, and means for slightly moving rectilinearly the feed member relative to the core in the direction of the return stroke before relatively rotating the holder and feed member to decrease the tension in said wire.

4. Apparatus for laying a winding in a pair of slots in the slotted core of a dynamo electric machine, comprising a temporary holder for said core, said temporary holder securing said core at the opposite ends thereof, a feed member of substantially circular cross section extending in coaxial relationship with the core mounted in said holder, said feed member having an eye intermediate its ends for the passage of wire from an external supply through said eye, two pairs of wire guide fingers detachably secured to each end of said holder remote from said core, one finger adjacent each end of each of said slots, each of said guide fingers having a U-shaped portion adjacent said holder for supporting the end turn portions of the winding, said fingers further extending axially beyond the ends of said holder and terminating at spaced points substantially at the surface of said feed member, said points being spaced along a curve transverse to the axis of said feed member by amounts sufficient to permit the entry of said wire therebetween; means for imparting relative rectilinear reciprocation to said holder and feed member solely along the axis of said core to cause the eye to pass from one end to the other of said holder and core to one side of a finger of each pair, means for relatively rotating said holder and feed member about the axis of said core through at least the angle between said slots just prior to each return stroke whereby the eye on the return strokes of reciprocation passes to the remote side of the other fingers of each pair, and means imparting slight relative rectilinear movement of the core and feed member in the direction of the return stroke along the axis of the core when said holder and feed member are rotated relatively to decrease the tension in said wire.

References Cited in the file of this patent
UNITED STATES PATENTS

| | | |
|---|---|---|
| 2,876,449 | Farmer | Mar. 3, 1959 |
| 2,967,672 | Zwayer | Jan. 10, 1961 |